United States Patent
Lamp, Jr.

[11] Patent Number: 5,852,987
[45] Date of Patent: Dec. 29, 1998

[54] PET FOOD CONTAINER SHIELDING DEVICE

[76] Inventor: Robert E. Lamp, Jr., 7629 N. 37th Ave., Phoenix, Ariz. 85051

[21] Appl. No.: 985,164

[22] Filed: Dec. 4, 1997

[51] Int. Cl.[6] .................................................. A01K 5/02
[52] U.S. Cl. ................................... 119/62; 119/52.4
[58] Field of Search ........................... 119/62, 63, 51.02, 119/52.4, 51.5

[56] References Cited

U.S. PATENT DOCUMENTS

| | | | |
|---|---|---|---|
| 2,492,604 | 12/1949 | Townsend | 119/62 |
| 2,589,427 | 3/1952 | Ossmann | 119/62 |
| 3,575,141 | 4/1971 | Elkins | 119/62 |
| 4,196,697 | 4/1980 | Poiesz | 119/51.02 |
| 4,216,743 | 8/1980 | Cohen | 119/484 |
| 4,771,735 | 9/1988 | Larsen | 119/62 |
| 5,188,060 | 2/1993 | Johnson | 119/58 |
| 5,335,624 | 8/1994 | Baxter et al. | 119/52.4 |
| 5,467,735 | 11/1995 | Chrisco | 119/52.4 |
| 5,492,083 | 2/1996 | Holladay | 119/62 |
| 5,649,499 | 7/1997 | Krietzman et al. | 119/62 |

*Primary Examiner*—Michael J. Carone
*Assistant Examiner*—Yvonne R. Abbott

[57] ABSTRACT

A new pet food container shielding device for encompassing a pet food container without inhibiting a pet from obtaining food while precluding rodents and birds from gaining access. The inventive device includes a container having an open top and an open bottom. The container has centrally disposed opening therethrough. A front door is positioned within the opening in the container and is hingedly secured to an upper edge of the opening. A counter weight is secured to an upper end of the front door on an interior surface thereof. The counter weight biases the front door to a position flush within the opening in the front wall.

8 Claims, 2 Drawing Sheets

PET FOOD CONTAINER SHIELDING DEVICE

BACKGROUND OF THE INVENTION

1. Field of the Invention

The present invention relates to pet feeders and more particularly pertains to a new pet food container shielding device for encompassing a pet food container without inhibiting a pet from obtaining food while precluding rodents and birds from gaining access.

2. Description of the Prior Art

The use of pet feeders is known in the prior art. More specifically, pet feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet feeders include U.S. Pat. No. 4,029,051 to McKinney; U.S. Pat. No. 4,161,924 to Welker; U.S. Pat. No. 5,404,838 to Khan; U.S. Pat. No. 4,389,976 to Novak; U.S. Pat. No. 4,793,290 to O'Donnell; and U.S. Pat. No. Des. 245,714 to Becker.

While these devices fulfill their respective, particular objectives and requirements, the aforementioned patents do not disclose a new pet food container shielding device. The inventive device includes a container having an open top and an open bottom. The container has centrally disposed opening therethrough. A front door is positioned within the opening in the container and is hingedly secured to an upper edge of the opening. A counter weight is secured to an upper end of the front door on an interior surface thereof. The counter weight biases the front door to a position flush within the opening in the front wall.

In these respects, the pet food container shielding device according to the present invention substantially departs from the conventional concepts and designs of the prior art, and in so doing provides an apparatus primarily developed for the purpose of encompassing a pet food container without inhibiting a pet from obtaining food while precluding rodents and birds from gaining access.

SUMMARY OF THE INVENTION

In view of the foregoing disadvantages inherent in the known types of pet feeders now present in the prior art, the present invention provides a new pet food container shielding device construction wherein the same can be utilized for encompassing a pet food container without inhibiting a pet from obtaining food while precluding rodents and birds from gaining access.

The general purpose of the present invention, which will be described subsequently in greater detail, is to provide a new pet food container shielding device apparatus and method which has many of the advantages of the pet feeders mentioned heretofore and many novel features that result in a new pet food container shielding device which is not anticipated, rendered obvious, suggested, or even implied by any of the prior art pet feeders, either alone or in any combination thereof.

To attain this, the present invention generally comprises a container having a generally rectangular configuration. The container has an open top, an open bottom and four walls. The four walls are removably coupled together at adjacent edges thereof in a piano hinge arrangement. The four walls include a front wall, a rear wall and opposed side walls. The four walls each have centrally disposed openings therethrough. The openings of the rear wall and the opposed side walls have a mesh screen secured therein. Each mesh screen has brackets secured to upper and lower ends thereof. A front door is positioned within the opening in the front wall of the container and is hingedly secured to an upper edge of the opening. A counter weight is secured to an upper end of the front door on an interior surface thereof. The counter weight biases the front door to a position flush within the opening in the front wall. A cover is removably positioned on the open top of the container. Three clear plastic covers are slidably positioned between the brackets of the mesh screens on the rear wall and the opposed side walls of the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet food container shielding device apparatus and method which has many of the advantages of the pet feeders mentioned heretofore and many novel features that result in a new pet food container shielding device which is not anticipated, rendered obvious, suggested, or even implied by any of the prior art pet feeders, either alone or in any combination thereof.

It is another object of the present invention to provide a new pet food container shielding device which may be easily and efficiently manufactured and marketed.

It is a further object of the present invention to provide a new pet food container shielding device which is of a durable and reliable construction.

An even further object of the present invention is to provide a new pet food container shielding device which is susceptible of a low cost of manufacture with regard to both materials and labor, and which accordingly is then susceptible of low prices of sale to the consuming public, thereby making such pet food container shielding device economically available to the buying public.

Still yet another object of the present invention is to provide a new pet food container shielding device which provides in the apparatuses and methods of the prior art some of the advantages thereof, while simultaneously overcoming some of the disadvantages normally associated therewith.

Still another object of the present invention is to provide a new pet food container shielding device for encompassing a pet food container without inhibiting a pet from obtaining food while precluding rodents and birds from gaining access.

Yet another object of the present invention is to provide a new pet food container shielding device which includes a container having an open top and an open bottom. The container has centrally disposed opening therethrough. A front door is positioned within the opening in the container and is hingedly secured to an upper edge of the opening. A counter weight is secured to an upper end of the front door on an interior surface thereof. The counter weight biases the front door to a position flush within the opening in the front wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
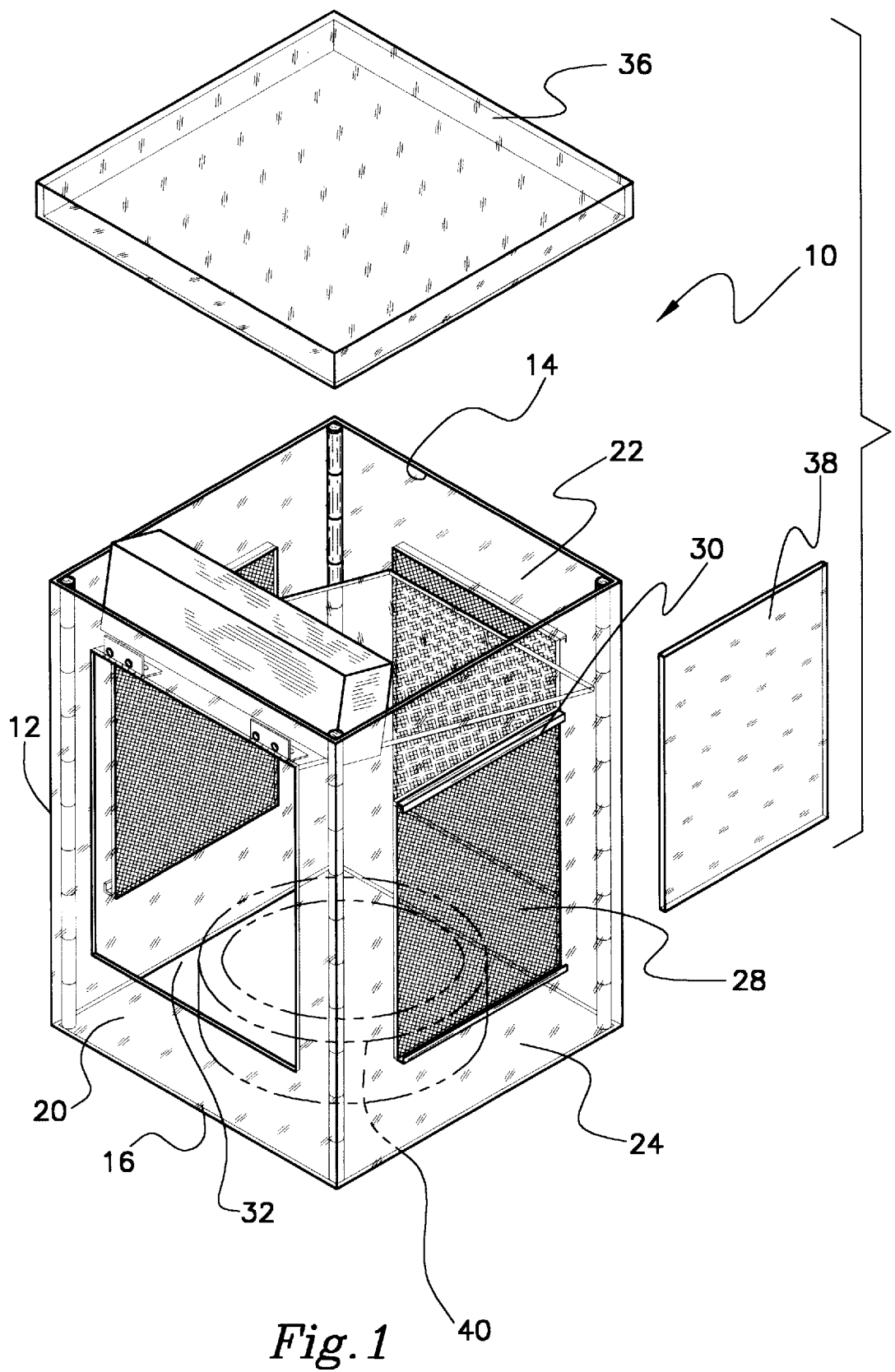
FIG. 1 is a perspective view of a new pet food container shielding device according to the present invention.
Figure 3:
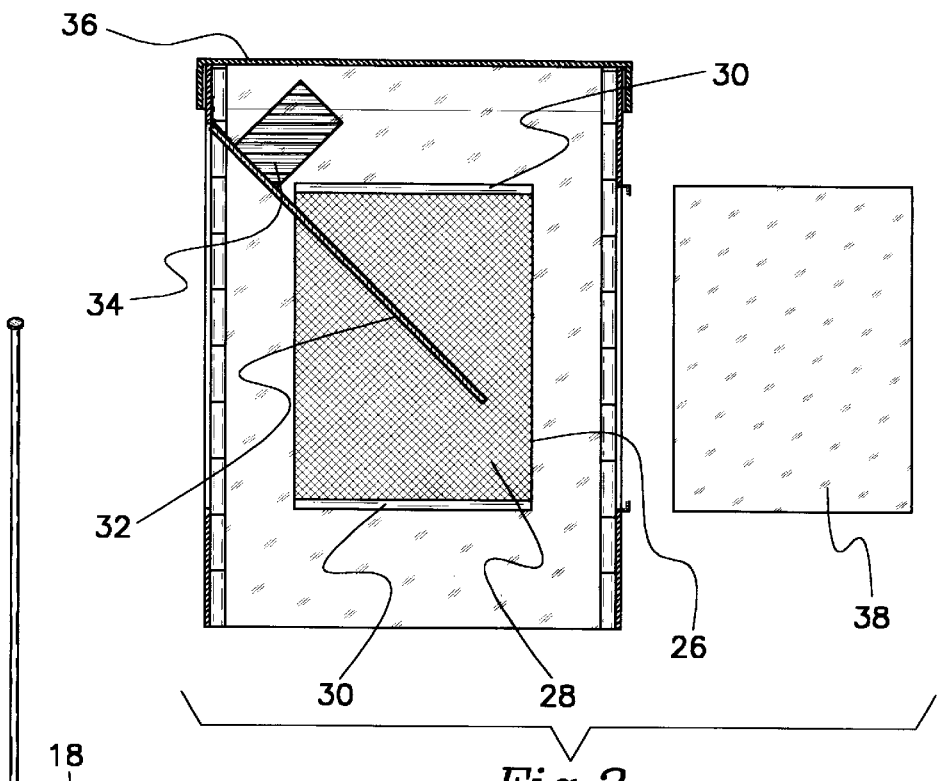
FIG. 3 is a side elevation view of the present invention shown in cross-section.
Figure 2:
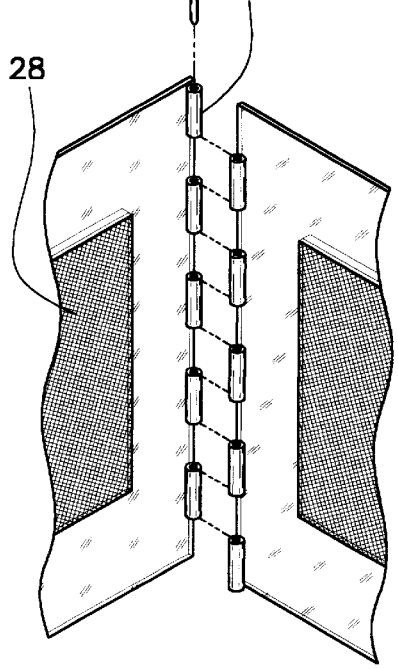
FIG. 2 is a partial perspective view of the present invention illustrating the piano hinge coupling thereof.
Figure 4:
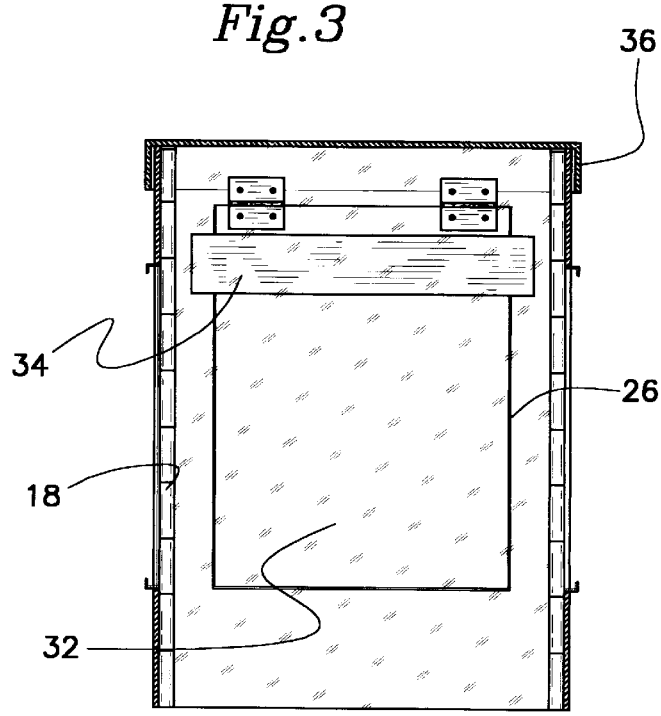
FIG. 4 is a front elevation view of the present invention shown in cross-section.

With reference now to the drawings, and in particular to FIGS. 1 through 4 thereof, a new pet food container shielding device embodying the principles and concepts of the present invention and generally designated by the reference numeral 10 will be described.

As best illustrated in FIGS. 1 through 4, the pet food container shielding device 10 comprises a container 12 having a generally rectangular configuration. The container 12 has an open top 14, an open bottom 16 and four walls. The four walls are removably coupled together at adjacent edges thereof in a piano hinge 18 arrangement. The four walls include a front wall 20, a rear wall 22 and opposed side walls 24. The four walls each have centrally disposed openings 26 therethrough. The openings 26 of the rear wall 22 and the opposed side walls 24 have a mesh screen 28 secured therein. Each mesh screen 28 has brackets 30 secured to upper and lower ends thereof.

A front door 32 is positioned within the opening 26 in the front wall 20 of the container 12 and is hingedly secured to an upper edge of the opening 26.

A counter weight 34 is secured to an upper end of the front door 32 on an interior surface thereof. The counter weight 34 biases the front door 32 to a position flush within the opening 26 in the front wall 20.

A cover 36 is removably positioned on the open top 14 of the container 12.

Three clear plastic covers 38 are slidably positioned between the brackets 30 of the mesh screens 28 on the rear wall 22 and the opposed side walls 24 of the container 12.

In use, the pet owner would simply place a filled pet dish 40 of a ground surface and then place the container 12 over the dish. The container 12 would form a barrier around the pet dish 40, thus preventing ants and other crawling insects from contaminating a pet's food. The device 10 would also prevent insects from stinging or biting the pet's mouth as a result of eating contaminated food. The pet would simply gain access to the interior of the container 12 by pressing their nose against the front door 32 which will pivot upwardly so as to allow the pet to put their head within the container 12 and reach the dish 40 positioned therein. Once the pet has finished with the pet dish 40 and removes their head from the interior of the container 12, the counter weight will bias the front door 32 outwardly to a position flush within the opening 26 in the front wall 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new pet food container shielding device for encompassing a pet food container without inhibiting a pet from obtaining food while precluding rodents and birds from gaining access comprising, in combination:

a container having a generally rectangular configuration, the container having an open top, an open bottom and four walls, the four walls being removably coupled together at adjacent edges thereof in a piano hinge arrangement, the four walls including a front wall, a rear wall and opposed side walls, the four walls each having centrally disposed openings therethrough, the openings of the rear wall and the opposed side walls having a mesh screen secured therein, each mesh screen having brackets secured to upper and lower ends thereof;

a front door positioned within the opening in the front wall of the container and hingedly secured to an upper edge of the opening;

a counter weight secured to an upper end of the front door on an interior surface thereof, the counter weight biasing the front door to a position flush within the opening in the front wall;

a cover removably positioned on the open top of the container; and three clear plastic covers slidably positioned between the brackets of the mesh screens on the rear wall and the opposed side walls of the container.

2. A new pet food container shielding device for encompassing a pet food container without inhibiting a pet from obtaining food while precluding rodents and birds from gaining access comprising, in combination:

a container having perimeter walls defining an interior space, the container having a centrally disposed opening in one of said walls into said interior;

a front door positioned adjacent to the opening in the container and hingedly secured to an upper edge of the opening; and a counter weight secured to the front door on an interior surface thereof, the counter weight biasing the front door to a position blocking the opening in the front wall, the counter weight having opposite ends extending laterally outward past an outer perimeter edge of the front door such that the ends of the counter weight abut an interior surface of the front wall for preventing the front door from pivoting outwardly through the opening in the front wall.

3. The pet food container shielding device as set forth in claim 2 wherein the container has a generally rectangular configuration, four walls of the container being removably coupled together at adjacent edges thereof in a piano hinge arrangement.

4. The pet food container shielding device as set forth in claim 2 further including a cover removably positioned on the open top of the container.

5. A new pet food container shielding device for encompassing a pet food container without inhibiting a pet from obtaining food while precluding rodents and birds from gaining access comprising, in combination:

a container having an open top and an open bottom, the container having centrally disposed opening therethrough;

a front door positioned within the opening in the container and hingedly secured to an upper edge of the opening;

a counter weight secured to an upper end of the front door on an interior surface thereof, the counter weight biasing the front door to a position flush within the opening in the front wall;

wherein the container has a generally rectangular configuration, four walls of the container being removably coupled together at adjacent edges thereof in a piano hinge arrangement; and wherein the four walls include a front wall, a rear wall and opposed side walls, the four walls each having centrally disposed openings therethrough, the openings of the rear wall and the opposed side walls having a mesh screen secured therein.

6. The pet food container shielding device as set forth in claim 5 wherein each mesh screen has brackets secured to upper and lower ends thereof.

7. The pet food container shielding device as set forth in claim 5 and further including three clear plastic covers slidably positioned between the brackets of the mesh screens on the rear wall and the opposed side walls of the container.

8. A new pet food container shielding device for encompassing a pet food container without inhibiting a pet from obtaining food while precluding rodents and birds from gaining access comprising, in combination:

a container having a generally rectangular configuration, the container having an open top, an open bottom and four walls, the four walls being removably coupled together at adjacent edges thereof in a piano hinge arrangement, the four walls including a front wall, a rear wall and opposed side walls, the four walls each having centrally disposed openings therethrough, the openings of the rear wall and the opposed side walls having a mesh screen secured therein, each mesh screen having brackets secured to upper and lower ends thereof;

a front door positioned within the opening in the front wall of the container and hingedly secured to an upper edge of the opening;

a counter weight secured to an upper end of the front door on an interior surface thereof, the counter weight biasing the front door to a position flush within the opening in the front wall, the counter weight having opposite ends being positioned such that each end of the counter weight extends outwardly past an outer perimeter edge of the front door such that the ends of the counter weight abut an interior surface of the front wall whereby the front door is prevented from pivoting outwardly through the opening in the front wall;

a cover removably positioned on the open top of the container; and three clear plastic covers slidably positioned between the brackets of the mesh screens on the rear wall and the opposed side walls of the container.

\* \* \* \* \*